United States Patent
Matsumura et al.

(10) Patent No.: US 9,308,923 B2
(45) Date of Patent: Apr. 12, 2016

(54) REGENERATIVE BRAKING EMERGENCY STOP SYSTEM

(75) Inventors: Takahiro Matsumura, Kobe (JP);
Shingo Okamura, Kobe (JP);
Chiyoharu Tonda, Sakai (JP); Eiji Yoshiyama, Kobe (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 204 days.

(21) Appl. No.: 14/355,356

(22) PCT Filed: Oct. 31, 2011

(86) PCT No.: PCT/JP2011/006085
§ 371 (c)(1),
(2), (4) Date: May 28, 2014

(87) PCT Pub. No.: WO2013/065079
PCT Pub. Date: May 10, 2013

(65) Prior Publication Data
US 2015/0094884 A1    Apr. 2, 2015

(51) Int. Cl.
| B60M 3/06 | (2006.01) |
| B61H 9/06 | (2006.01) |
| B60L 3/00 | (2006.01) |
| B60L 3/04 | (2006.01) |

(Continued)

(52) U.S. Cl.
CPC .............. B61H 9/06 (2013.01); B60L 3/0069 (2013.01); B60L 3/04 (2013.01); B60L 7/14 (2013.01); B60L 9/22 (2013.01); B60M 3/06 (2013.01);

(Continued)

(58) Field of Classification Search
CPC ..................... H04B 2203/547; H04B 3/548
USPC .................................................. 307/2, 9.1
See application file for complete search history.

(56) References Cited

U.S. PATENT DOCUMENTS

| 5,331,261 A * | 7/1994 | Brown .................. B60L 7/22 246/182 A |
| 2008/0004760 A1* | 1/2008 | Sogihara ............... B60L 3/0076 701/22 |

FOREIGN PATENT DOCUMENTS

| JP | A-06-189411 | 7/1994 |
| JP | A-06-197401 | 7/1994 |

(Continued)

OTHER PUBLICATIONS

Jan. 31, 2012 International Search Report issued in International Application No. PCT/JP2011/006085.

*Primary Examiner* — Fritz M Fleming
(74) *Attorney, Agent, or Firm* — Oliff PLC

(57) ABSTRACT

In a regenerative braking emergency stop system, a substation includes: a rectifier transformer configured to transform AC power received from outside; a rectifier configured to convert the transformed AC power into DC power; and a switch disposed on an electrical path between the rectifier and a power-feed rail and configured to be in a closed state or an opened state; a simulated ripple transmitter configured to transmit a simulated ripple, the simulated ripple being an AC signal having a predetermined frequency; a superimposing circuit connected to the power-feed rail in parallel with the rectifier and configured to superimpose the simulated ripple transmitted from the simulated ripple transmitter on DC power outputted from the rectifier; and a relay device configured to allow the simulated ripple transmitter to transmit the simulated ripple when the rectifier is receiving power from outside and the switch is in a closed state.

10 Claims, 8 Drawing Sheets

(51) Int. Cl.
  *B60L 7/14*    (2006.01)
  *B60L 9/22*    (2006.01)
  *B60T 13/66*   (2006.01)
  *B60T 17/22*   (2006.01)
(52) U.S. Cl.
  CPC ............ *B60T 13/665* (2013.01); *B60T 17/228* (2013.01); *B60L 2200/26* (2013.01)

(56) References Cited

FOREIGN PATENT DOCUMENTS

| | | |
|---|---|---|
| JP | A-2002-187552 | 7/2002 |
| JP | A-2004-023988 | 1/2004 |
| JP | A-2005-027378 | 1/2005 |

\* cited by examiner

| | | | | | | | | |
|---|---|---|---|---|---|---|---|---|
| Tr1 SIDE | AUXILIARY RELAY 51 | FEED | OPEN | FEED | OPEN | FEED | OPEN | FEED | OPEN |
| | AUXILIARY RELAY 53 | FEED | FEED | OPEN | OPEN | FEED | FEED | OPEN | OPEN |
| Tr2 SIDE | AUXILIARY RELAY 52 | FEED | FEED | FEED | FEED | OPEN | OPEN | OPEN | OPEN |
| | AUXILIARY RELAY 54 | FEED | FEED | FEED | FEED | FEED | FEED | FEED | FEED |
| | SIMULATED RIPPLE TRANSMITTER Tx | TRANSMISSION -ENABLED | TRANSMISSION -ENABLED | TRANSMISSION -ENABLED | TRANSMISSION -ENABLED | TRANSMISSION -ENABLED | TRANSMISSION -ENABLED | TRANSMISSION -DISABLED | TRANSMISSION -DISABLED |

| | | | | | | | | |
|---|---|---|---|---|---|---|---|---|
| Tr1 SIDE | AUXILIARY RELAY 51 | FEED | OPEN | FEED | OPEN | FEED | OPEN | FEED | OPEN |
| | AUXILIARY RELAY 53 | FEED | FEED | OPEN | OPEN | FEED | FEED | OPEN | OPEN |
| Tr2 SIDE | AUXILIARY RELAY 52 | FEED | FEED | FEED | FEED | OPEN | OPEN | OPEN | OPEN |
| | AUXILIARY RELAY 54 | OPEN | OPEN | OPEN | OPEN | OPEN | OPEN | OPEN | OPEN |
| | SIMULATED RIPPLE TRANSMITTER Tx | TRANSMISSION -ENABLED | TRANSMISSION -DISABLED | TRANSMISSION -ENABLED | TRANSMISSION -DISABLED | TRANSMISSION -DISABLED | TRANSMISSION -DISABLED | TRANSMISSION -DISABLED | TRANSMISSION -DISABLED |

Fig. 2 ured by a power converter 12 (in the example of FIG. 8, a VVVF (Variable Voltage Variable Frequency) inverter) into
REGENERATIVE BRAKING EMERGENCY STOP SYSTEM

TECHNICAL FIELD

The present invention relates to regenerative braking emergency stop systems.

BACKGROUND ART

In a substation for electric railcars, when an emergency has occurred while an electric vehicle is running on a railroad line, for example, when a relay has detected an occurrence of an electrical accident such as electric leakage or ground fault, or when an emergency alarm (e.g., an emergency warning signal) has been given due to, for example, entry by someone into a track including a power-feed rail, it is necessary for the substation to immediately stop power feeding to cut off power to the power-feed rail.

In the case of a substation of a DC feeding system, it is known that, due to a rectifying operation by a rectifier of the substation, a ripple (a pulsating current) is superimposed on a DC feeding voltage sent from the substation to a power-feed rail. Accordingly, as disclosed in Patent Literature 1, cutting off of the power sent from the substation can be detected based on disappearance of the ripple superimposed on the DC feeding voltage. It should be noted that Patent Literature 2 discloses a power cut-off detection method applied to an AC electric railcar configured to stop regenerative braking when detecting cutting off of power feeding.

CITATION LIST

Patent Literature

PTL 1: Japanese Laid-Open Patent Application Publication No. H06-197401
PTL 2: Japanese Laid-Open Patent Application Publication No. H06-189411

SUMMARY OF INVENTION

Technical Problem

However, even if the power to the power-feed rail is cut off immediately, in a case where there is an electric vehicle that is performing regenerative braking among electric vehicles running on the railroad line, then an electrical accident or an emergency continues until the electric vehicle stops running.

In addition, generally speaking, as shown in FIG. 8, in a substation of a DC feeding system, three-phase AC power having an extra-high voltage or supervoltage received from a power company is stepped down by a transformer 2. (In the example of FIG. 8, the transformer 2 is configured such that delta connection is made at the primary side of the transformer, and that delta connection and star connection are made at the secondary side of the transformer.) The stepped-down three-phase AC power is converted by a rectifier 4 (in the example of FIG. 8, the rectifier 4 is a silicon rectifier) into DC feeding power, and the feeding power is sent to a contact line 6, which is a third rail or an overhead line (in the example of FIG. 8, a catenary). Meanwhile, an electric vehicle 10, while running on a running rail 8, receives the feeding power from the contact line 6 via a power collector 11 (in the example of FIG. 8, a pantograph). The feeding power is converted by a power converter 12 (in the example of FIG. 8, a VVVF (Variable Voltage Variable Frequency) inverter) into AC power having a desired voltage and a desired frequency. The AC power is supplied to an electric motor 13 configured to drive wheels 14. It should be noted that when the electric vehicle 10 reduces its speed, the electric motor 13 serves as a power generator, and regenerative power (regenerative voltage) generated by the electric motor 13 is supplied to the contact line 6.

However, it is known that the regenerative voltage, which is generated through regenerative braking by the electric vehicle, does not serve as an effective voltage unless the regenerative voltage is higher than the no-load voltage of the substation. Moreover, if the regenerative voltage increases to exceed the feeding voltage sent from the substation, then the ripple superimposed on the feeding voltage disappears due to the configuration of the rectifier of the substation. This is described below with reference to the example of FIG. 8. In a case where the voltage of the overhead line 6 increases to exceed the feeding voltage from the substation (i.e., exceed the secondary-side voltage of the transformer 2), rectifying elements such as diodes forming the rectifier 4 used in the substation are kept in an OFF state, and therefore, the rectifier 4 is unable to perform a normal rectifying operation.

As described above, factors causing the ripple disappearance include not only the cutting off of power to the power-feed rail, but also increase in the regenerative voltage of the electric vehicle. Therefore, there arises a problem in that an electric vehicle that is performing regenerative braking detects ripple disappearance caused by increase in the regenerative voltage even though the power to the power-feed rail has not been cut off, which erroneously stops the regenerative braking. Patent Literature 1 neither discloses nor suggests the ripple disappearance that is caused by increase in the regenerative voltage. The power cut-off detection method of Patent Literature 1 merely detects cutting off of the power to the power-feed rail. Therefore, the power cut-off detection method of Patent Literature 1 cannot solve the above problem. Similarly, Patent Literature 2 fails to disclose or suggest the ripple disappearance that is caused by increase in the regenerative voltage. Even if the regenerative braking is stopped when the cutting off of power feeding is detected as in the power cut-off detection method of Patent Literature 2, the ripple disappearance that is caused by increase in the regenerative voltage cannot be detected with the method of Patent Literature 2. Therefore, the aforementioned problem cannot be solved by the method of Patent Literature 2.

It should be noted that, as a countermeasure for the problem, non-effective regenerative voltage may be designed to be lower than usual so that the voltage of the power-feed rail will not exceed the feeding voltage of the substation. However, such designing may cause a situation where the generated regenerative power cannot be sufficiently returned from the electric vehicle to the power-feed rail. This causes another problem in that the generated regenerative power is discarded as heat by a braking resistor, or in that the usage of a mechanical brake increases.

The present invention has been made to solve the above-described problems. An object of the present invention is to provide a regenerative braking emergency stop system capable of: generating sufficient regenerative power from an electric vehicle at a normal time; and assuredly stopping regenerative braking of the electric vehicle running on a running rail in case of emergency where power feeding from a substation to a power-feed rail is stopped.

Solution to Problem

In order to solve the above-described problems, a regenerative braking emergency stop system according to one aspect of the present invention includes: a substation; a power-feed rail fed with power from the substation; a running rail; and an electric vehicle configured to collect power from the power-feed rail and run on the running rail. The substation includes: a rectifier transformer configured to transform AC power received from outside; a rectifier configured to convert the AC power transformed by the rectifier transformer into DC power; and a switch disposed on an electrical path between the rectifier and the power-feed rail and configured to be in a closed state or an opened state. The electric vehicle includes a power collector configured to collect power from the power-feed rail. The substation further includes: a simulated ripple transmitter configured to transmit a simulated ripple, the simulated ripple being an AC signal having a predetermined frequency; a superimposing circuit connected to the power-feed rail in parallel with the rectifier and configured to superimpose the simulated ripple transmitted from the simulated ripple transmitter on DC power outputted from the rectifier; and a relay device configured to allow the simulated ripple transmitter to transmit the simulated ripple when the rectifier is receiving power from outside and the switch is in a closed state. The electric vehicle further includes: a simulated ripple receiver configured to detect the simulated ripple from DC power collected by the power collector; and a controller configured to perform control to stop regenerative braking of the electric vehicle when having detected that the simulated ripple to be detected by the simulated ripple receiver has disappeared.

The term "case of emergency" refers to when it is necessary to stop feeding power from the substation to the electric vehicle, for example, when a relay has detected an occurrence of an electrical accident such as electric leakage or ground fault, or when an emergency alarm (e.g., an emergency warning signal) has been given due to, for example, entry by someone into a track including the power-feed rail, or when the electric vehicle is about to pass through a gap/dead section of a third rail system.

According to the above configuration, while power is being fed from the substation to the power-feed rail (i.e., at a normal time), the rectifier receives power from outside and the switch is in a closed state. Accordingly, the simulated ripple transmitter is in a state of being able to transmit a simulated ripple to the power-feed rail. Even in a case where the rectifier becomes unable to perform a normal rectifying operation due to increase in the regenerative voltage of the electric vehicle, the simulated ripple transmitted from the simulated ripple transmitter is superimposed on the voltage sent from the substation to the power-feed rail. Thus, the electric vehicle can detect the simulated ripple by means of the simulated ripple receiver from the power collected from the power-feed rail, thereby detecting that the power to the power-feed rail has not been cut off, and the detection is not affected by the regenerative voltage. That is, erroneous stopping of the regenerative braking is eliminated. In addition, since it is not necessary to take rectifier ripples into consideration, the regenerative voltage generated by the regenerative braking of the electric vehicle can be designed to be an effective voltage higher than the no-load voltage of the substation. This allows the electric vehicle to generate regenerative power more efficiently without waste.

Meanwhile, in case of emergency, the switch is turned from in a closed state to in an opened state since it is necessary to stop feeding power from the substation to the power-feed rail. At the time, conditions for the relay device, which are that the rectifier is receiving power from outside and that the switch is in a closed state, are not satisfied; therefore the simulated ripple transmitter is in a state of being unable to transmit a simulated ripple to the power-feed rail. As a result, no simulated ripple flows to the power-feed rail. Thus, the electric vehicle detects that the simulated ripple to be detected by the simulated ripple receiver has disappeared, which allows the electric vehicle to stop regenerative braking.

The regenerative braking emergency stop system may include a detector configured to detect a primary-side voltage, a primary-side current, or a secondary-side voltage of the rectifier transformer. The relay device may be configured to detect that the rectifier is receiving power from outside based on a detection result of the detector.

This configuration makes it possible to suitably and readily detect a condition that the rectifier is receiving power from outside, which is one of the following AND conditions for the relay device (conditions to allow a simulated ripple to be transmitted): a condition that the rectifier is receiving power from outside and a condition that the switch is in a closed state.

In the regenerative braking emergency stop system, the relay device may include: a first relay whose contact point is opened and closed in conjunction with the opened state and the closed state of the switch; and a second relay whose contact point is opened and closed in conjunction with a detection result of the detector. The first relay and the second relay may be connected in series on a power supply line or an output signal line of the simulated ripple transmitter.

This configuration makes it possible to suitably and readily realize the AND conditions for the relay device (conditions to allow a simulated ripple to be transmitted), i.e., a condition that the rectifier is receiving power from outside and a condition that the switch is in a closed state.

In the regenerative braking emergency stop system, a plurality of the substations may be provided for the power-feed rail, and the simulated ripple transmitter provided for each of the plurality of the substations may be configured such that the simulated ripple transmitter generates a simulated ripple having the predetermined frequency based on an AC low-frequency signal and outputs the simulated ripple. The AC low-frequency signal has a frequency lower than the predetermined frequency and is inputted to the simulated ripple transmitter via a common signal line.

According to this configuration, operations of the simulated ripple transmitters of the respective substations are in synchronization with each other, and consequently, simulated ripples transmitted from the respective simulated ripple transmitters to the power-feed rail synchronize with each other. That is, the AC low-frequency signal is used like a so-called pilot signal in the field of radio communication. The frequency of the AC low-frequency signal is so low as to allow synchronization among the plurality of substations to be readily made. Accordingly, relative phase differences among the simulated ripples transmitted from the plurality of respective substations are suppressed.

In the above regenerative braking emergency stop system, the simulated ripple transmitter may include: a rectifier transformer configured to transform AC power received from a power receiving line, from which the substation receives AC power; a rectifier configured to convert the AC power transformed by the rectifier transformer into DC power; and a transformer configured to extract a simulated ripple superimposed on the DC power converted by the rectifier. The superimposing circuit may include a DC-blocking capacitor disposed between an output terminal of the simulated ripple transmitter and the power-feed rail.

This configuration makes it possible to generate a simulated ripple having the same frequency and the same phase as a ripple generated by the rectifier of the substation.

The regenerative braking emergency stop system may include: a plurality of the simulated ripple transmitters in the substation, the plurality of the simulated ripple transmitters being configured to transmit a plurality of the simulated ripples that have different frequencies from each other; and a plurality of the simulated ripple receivers in the electric vehicle, the plurality of the simulated ripple receivers corresponding to the plurality of the simulated ripples, respectively.

According to this configuration, a plurality of the simulated ripples having different frequencies from each other can be used for respective DC power transmission sections demarcated by power-feed rails. This makes it possible to flexibly construct the system to accommodate actual train routes.

In the regenerative braking emergency stop system, in a case where routes each formed by the running rail and the power-feed rail converge, the simulated ripples having different frequencies from each other may be allocated to the respective routes.

According to the above configurations, in a case where train routes converge, for example, like grade-separated subway routes, the simulated ripples having different frequencies from each other are allocated to the respective routes. Thus, the simulated ripples can be prevented from interfering with each other.

In the regenerative braking emergency stop system, the power-feed rail may be a third rail, and the electric vehicle may detect a gap/dead section of a third rail system when having detected that the simulated ripple to be detected by the simulated ripple receiver has disappeared.

According to this configuration, when the electric vehicle passes through a gap/dead section of the third rail system (i.e., at the time of emergency), the electric vehicle can detect disappearance of the simulated ripple transmitted from the substation and stop regenerative braking, thereby passing through the gap/dead section smoothly.

In the regenerative braking emergency stop system, the substation may include an electrical storage device configured to store power generated by the regenerative braking of the electric vehicle.

According to this configuration, power generated during the regenerative braking can be stored in the electrical storage device without waste, and the energy-saving effect of the entire power-feeding system can be improved.

In order to solve the above-described problems, a regenerative braking emergency stop system according to another aspect of the present invention includes: a substation; a power-feed rail fed with power from the substation; a running rail; and an electric vehicle configured to collect power from the power-feed rail and run on the running rail. The substation includes: a rectifier transformer configured to transform AC power received from outside; a rectifier configured to convert the AC power transformed by the rectifier transformer into DC power; and a switch disposed on an electrical path between the rectifier and the power-feed rail and configured to be in a closed state or an opened state. The electric vehicle includes a power collector configured to collect power from the power-feed rail. The substation includes: a plurality of power-feeding systems each including the rectifier transformer, the rectifier, and the switch; a simulated ripple transmitter configured to transmit a simulated ripple, the simulated ripple being an AC signal having a predetermined frequency; and a superimposing circuit configured to superimpose the simulated ripple transmitted from the simulated ripple transmitter on DC power outputted from the rectifier. The simulated ripple transmitter and the superimposing circuit are connected parallel to the rectifier. The simulated ripple transmitter includes: a rectifier transformer configured to transform AC power received from a power receiving line, from which the substation receives AC power; a rectifier configured to convert the AC power transformed by the rectifier transformer into DC power; and a transformer configured to extract a simulated ripple superimposed on the DC power converted by the rectifier. The superimposing circuit includes a DC-blocking capacitor disposed between an output terminal of the simulated ripple transmitter and the power-feed rail. The electric vehicle further includes: a simulated ripple receiver configured to detect the simulated ripple from DC power collected by the power collector; and a controller configured to perform control to stop regenerative braking of the electric vehicle when having detected that the simulated ripple to be detected by the simulated ripple receiver has disappeared.

This configuration makes it possible to provide a regenerative braking emergency stop system capable of: generating sufficient regenerative power from the electric vehicle at a normal time; and assuredly stopping regenerative braking of the electric vehicle running on the running rail in case of emergency where power feeding from the substation to the power-feed rail is stopped. Moreover, the above configuration makes it possible to readily generate a simulated ripple having the same frequency and the same phase as a ripple generated by the rectifier of the substation. Furthermore, the above configuration does not need to include a relay device. Accordingly, the system configuration can be simplified.

In order to solve the above-described problems, a regenerative braking emergency stop system according to yet another aspect of the present invention includes: an electrical instruction center; a substation; a power-feed rail fed with power from the substation; a running rail; and an electric vehicle configured to collect power from the power-feed rail and run on the running rail. The regenerative braking emergency stop system is configured to stop regenerative braking of the electric vehicle running on the running rail in case of emergency where power feeding from the substation to the power-feed rail is stopped. The electrical instruction center includes a radio transmission unit configured to transmit a power cut-off instruction to the substation and transmit a regenerative braking stop instruction to stop the regenerative braking of the electric vehicle. The electric vehicle includes: a radio receiving unit configured to receive the regenerative braking stop instruction transmitted from the radio transmission unit; and a controller configured to perform control to stop the regenerative braking when the radio receiving unit has received the regenerative braking stop instruction.

This configuration makes it possible to provide a regenerative braking emergency stop system capable of: generating sufficient regenerative power from the electric vehicle at a normal time; and assuredly stopping regenerative braking of the electric vehicle running on the running rail in case of emergency where power feeding from the substation to the power-feed rail is stopped.

The above object, other objects, features, and advantages of the present invention will be made clear by the following detailed description of preferred embodiments with reference to the accompanying drawings.

Advantageous Effects of Invention

The present invention makes it possible to provide a regenerative braking emergency stop system capable of: generating sufficient regenerative power from an electric vehicle at a normal time; and assuredly stopping regenerative braking of the electric vehicle running on a running rail in case of emergency where power feeding from a substation to a power-feed rail is stopped.

BRIEF DESCRIPTION OF DRAWINGS

FIG. 2 is a diagram for use in describing transmission conditions for a simulated ripple transmitter according to Embodiment 1 of the present invention.

DESCRIPTION OF EMBODIMENTS

Figure 1:
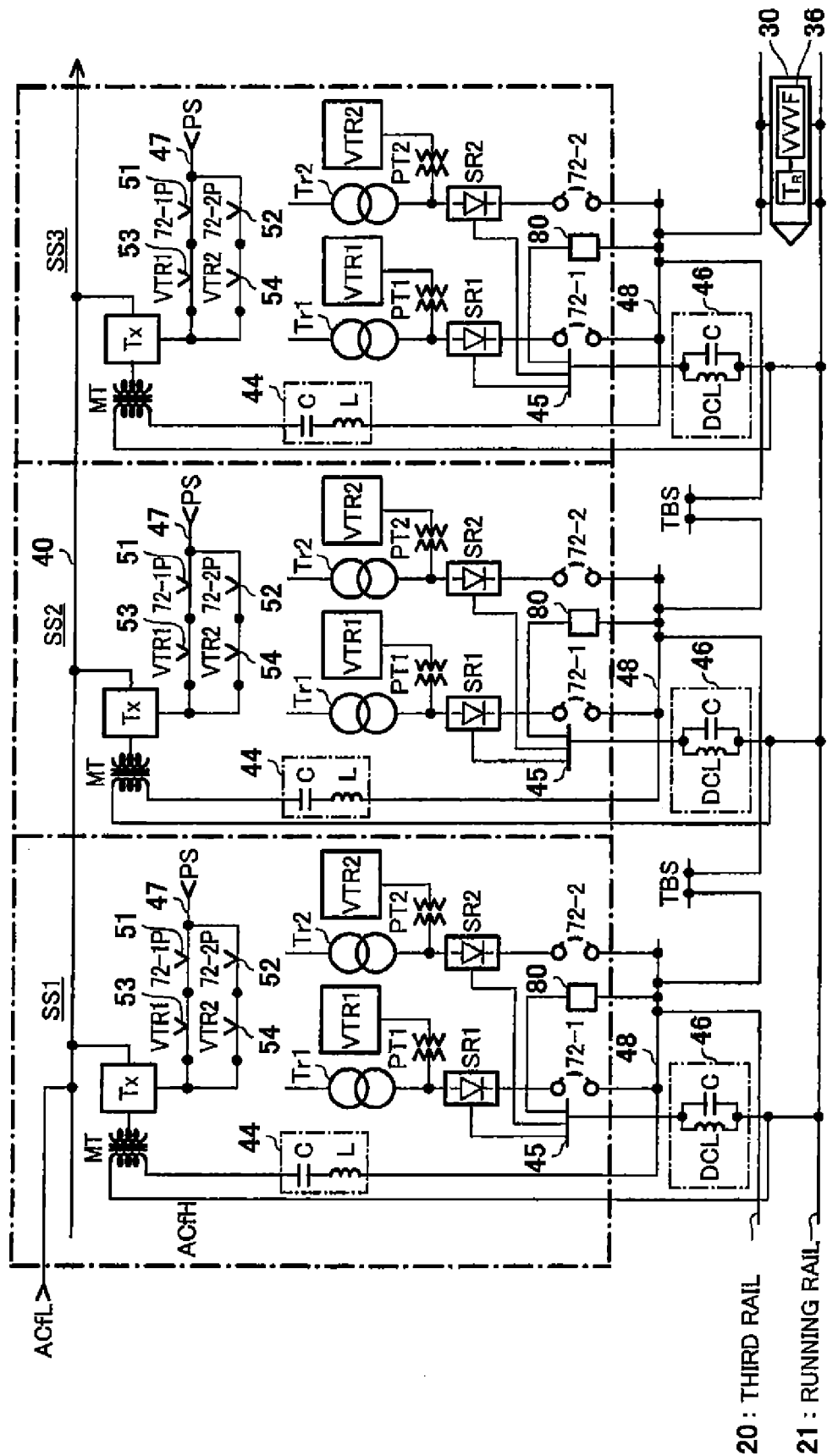
FIG. 1 is a circuit diagram showing an example of the configuration of a regenerative braking emergency stop system according to Embodiment 1 of the present invention.

Hereinafter, embodiments of the present invention are described with reference to the drawings. In the drawings, the same or corresponding elements are denoted by the same reference signs, and repeating the same descriptions is avoided below.

(Embodiment 1)
[Example of System Configuration]

FIG. 1 is a circuit diagram showing an example of the configuration of a regenerative braking emergency stop system according to Embodiment 1 of the present invention. The regenerative braking emergency stop system is configured such that when an emergency has occurred while an electric vehicle is running on a railroad line, for example, when a relay has detected an occurrence of an electrical accident such as electric leakage or ground fault, or when an emergency alarm (e.g., an emergency warning signal) has been given due to, for example, entry by someone into a track including a power-feed rail, the system immediately stops power feeding to cut off power to the power-feed rail and stops regenerative braking of the electric vehicle.

In the system configuration example shown in FIG. 1, substations (SS1, SS2, SS3), a third rail 20, a running rail 21, and an electric vehicle 30 are configured to be adapted for a so-called third rail system. The third rail 20 has a DC power transmission section divided into a plurality of unit sections (hereinafter, simply referred to as sections). (FIG. 1 illustratively shows only three sections among the plurality of unit sections.) The substations (SS1, SS2, SS3) are provided for the respective sections. Hereinafter, in order to simplify the description, the configuration of only the substation SS 1 is described. The description below is similarly applicable to the substations SS2 and SS3, and the other substations which are not shown in the drawings.

In the substation SS1, two rectifier transformers Tr1 and Tr2 are operated in parallel. The substation 551 is configured to feed power to the third rail 20 from the rectifier transformers Tr1 and Tr2 via rectifiers SR1 and SR2 and switches 72-1 and 72-2. In order to improve an energy-saving effect of the entire system, an electrical storage device 80 is disposed between the third rail 20 and a substation bus 45, to store power generated by regenerative braking of the electric vehicle 30. The substation bus 45 will be described below. In the present embodiment, the electrical storage device 80 is a wayside energy storage. However, as an alternative, the electrical storage device 80 may be an on-vehicle electrical storage device to be mounted on the electric vehicle 30. Hereinafter, in order to simplify the description, the configuration of only the rectifier transformer Tr1 side (Tr1, SR1, 72-1) is described. The description below is similarly applicable to the configuration of the rectifier transformer Tr2 side (Tr2, SR2, 72-2).

The primary side of the rectifier transformer Tr1 receives AC power (AC voltage) having an extra-high voltage or supervoltage from outside (e.g., from a commercial power grid). The secondary side of the rectifier transformer Tr1 is connected to the input side of the rectifier SR1. That is, an AC voltage stepped down by the rectifier transformer Tr1 is applied to the input side of the rectifier SR1. One end of the switch 72-1 is connected to the output side of the rectifier SR1, and the other end of the switch 72-1 is connected to the third rail 20. That is, the switch 72-1 is provided on an electrical path between the rectifier SR1 and the third rail 20. The rectifier SR1 performs AC-DC conversion. After the AC-DC conversion, the converted DC power (DC voltage) is fed to the third rail 20 via the switch 72-1.

Figure 8:
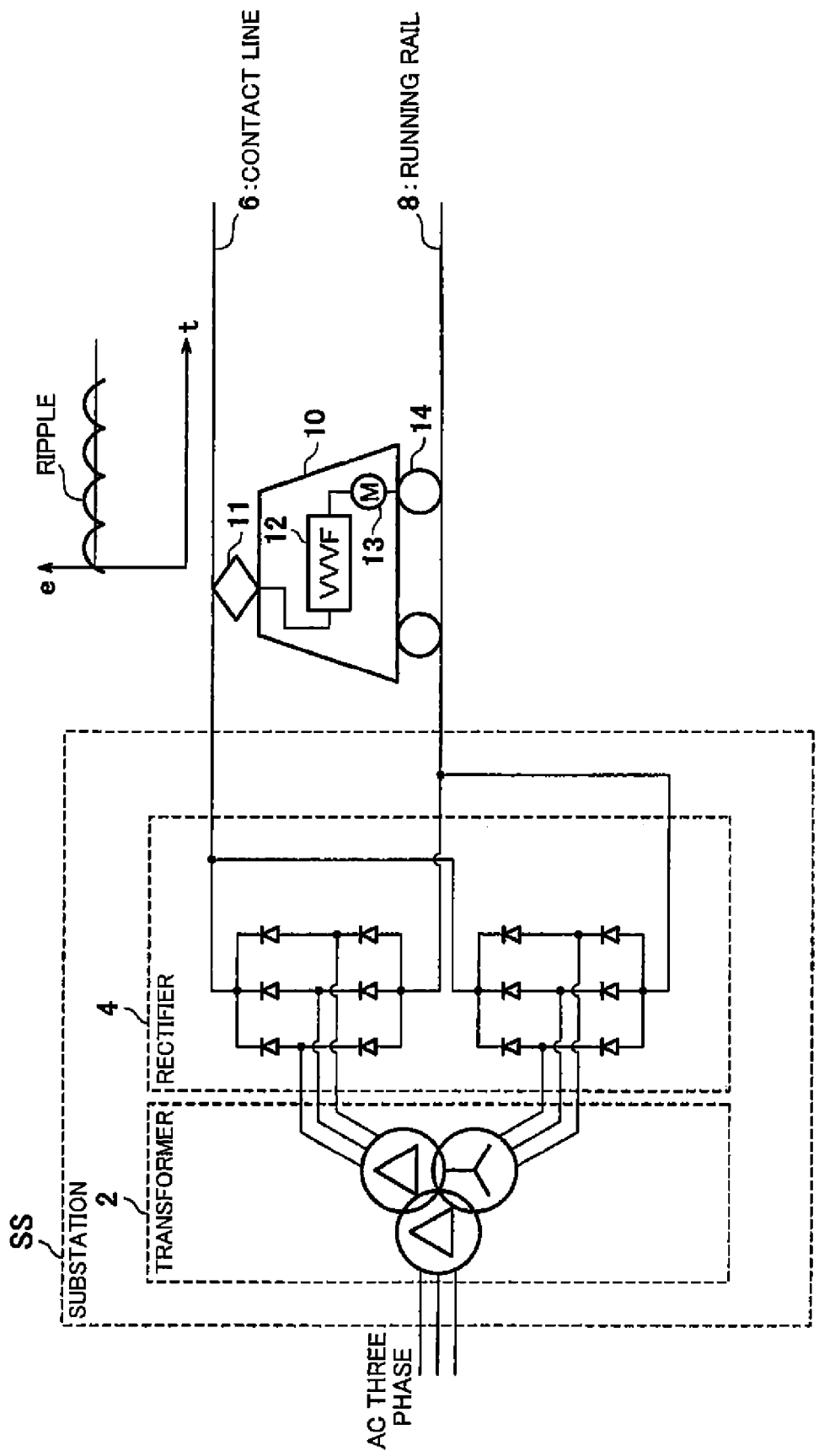
FIG. 8 is a schematic diagram for use in describing disappearance of a ripple from a rectifier output due to increase in regenerative voltage of an electric vehicle.

The rectifier transformer Tr1 herein is, for example, a three-phase transformer with delta-delta connection and delta-star connection as shown in FIG. 8. However, the configuration of the rectifier transformer Tr1 is not limited to the one shown in FIG. 8. The rectifier SR1 is a silicon rectifier using a diode as a rectifying element, a thyristor rectifier using a thyristor as a rectifying element, or the like. The switch 72-1 is a DC circuit breaker, a DC electromagnetic contactor, or the like. The switch 72-1 is configured to be closed and opened in conjunction with closing and opening of the contact point of an auxiliary relay 51 disposed on a power supply line 47 of a simulated ripple transmitter Tx. The simulated ripple transmitter Tx will be described below. It should be noted that a sign "72-1P" near the auxiliary relay 51 in FIG. 1 indicates that the contact point of the auxiliary relay 51 is closed when the switch 72-1 is in a closed state. On the other hand, the contact point of the auxiliary relay 51 is opened when the switch 72-1 is in an opened state. The switch 72-1 is in a closed state when power is fed to the third rail 20; while the switch 72-1 is opened when an occurrence of an electrical accident such as electric leakage or ground fault has been detected by a particular protective relay disposed near the accident site or in the substation SS1, or when an emergency alarm (e.g., an emergency warning signal) has been given due to, for example, entry by someone into a track including the third rail 20.

It should be noted that the secondary side of the rectifier transformer Tr1 is connected to the primary side of a potential transformer PT 1, and the secondary side of the potential transformer PT1 is connected to a voltage relay VTR1. The voltage relay VTR1 operates in conjunction with an auxiliary relay 53 (second relay), which is connected in series to the auxiliary relay 51 (first relay) on the power supply line 47 of the simulated ripple transmitter Tx. The simulated ripple transmitter Tx will be described below. A sign "VTR1" near the auxiliary relay 53 in FIG. 1 indicates that the contact point of the auxiliary relay 53 is closed when the voltage relay VTR1 has detected the secondary-side voltage of the potential transformer PT1 becoming a predetermined threshold voltage. It should be noted that the predetermined threshold voltage is the secondary-side voltage of the potential transformer PT1 when the rectifier SR1 is receiving a proper voltage from outside. In other words, if the secondary-side voltage of the potential transformer PT1 falls below the predetermined threshold voltage and the rectifier SR1 is not receiving a predetermined AC voltage from outside, the contact point of the auxiliary relay 53 is opened.

Based on the above, when both the auxiliary relay 51 and the auxiliary relay 53 are closed (when the switch 72-1 is in a closed state and the input side of the rectifier SR1 is receiving a proper voltage from outside (i.e., from a commercial power grid)), a power supply voltage is applied to the simulated ripple transmitter Tx. Thus, the simulated ripple transmitter Tx, which will be described below, becomes in a state of being able to transmit, or in a transmission-enabled state. On the other hand, when the contact point of the auxiliary relay 51 or the auxiliary relay 53 is opened (when the switch 72-1 is in an opened state or the input side of the rectifier SR1 is not receiving a proper voltage from outside), no power supply voltage is applied to the simulated ripple transmitter Tx. Thus, the simulated ripple transmitter Tx, which will be described below, becomes in a state of being unable to transmit, or in a transmission-disabled state. In this manner, a ripple disappearing phenomenon, in which a ripple to be superimposed on an output from the substation disappears when power feeding is cut off, is simulated.

Further, since the two rectifier transformers Tr1 and Tr2 are operated in parallel in the substation SS1, the auxiliary relays 51 and 53 at the rectifier transformer Tr1 side and auxiliary relays 52 and 54 at the rectifier transformer Tr2 side are in a parallel relationship. That is, when both the auxiliary relay 51 and the auxiliary relay 53 are closed, or when both the auxiliary relay 52 and the auxiliary relay 54 are closed, the simulated ripple transmitter Tx becomes in a transmission-enabled state. On the other hand, when the contact point of the auxiliary relay 51 or the auxiliary relay 53 is opened and the contact point of the auxiliary relay 52 or the auxiliary relay 54 is opened, the ripple transmitter Tx becomes in a transmission-disabled state. These condition settings are shown in FIG. 2.

Next, the configuration of the simulated ripple transmitter Tx is described in relation to a signal system.

The same AC low-frequency signal ACfL is inputted to the simulated ripple transmitter Tx of each of the substations SS1, SS2, and SS3 via a common signal line 40. It should be noted that the frequency of the AC low-frequency signal ACfL is required to be in the range of 15 to 60 Hz, and is preferably 30 Hz. Meanwhile, the frequency of an AC high-frequency signal ACfH is 480 Hz, for example.

Figure 3:
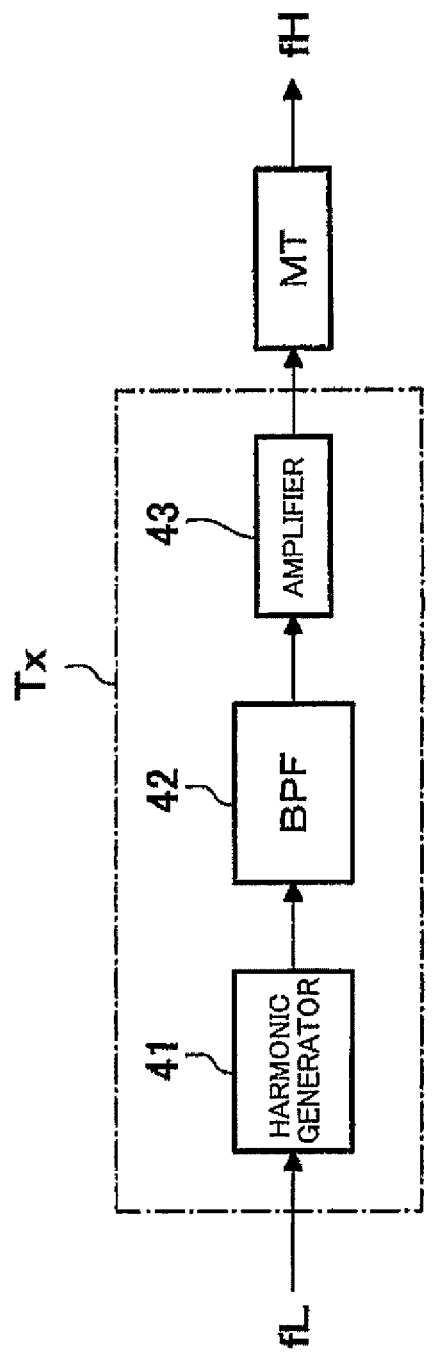
FIG. 3 is a block diagram showing an example of the configuration of the simulated ripple transmitter according to Embodiment 1 of the present invention.

FIG. 3 shows an example of the configuration of the simulated ripple transmitter Tx. The simulated ripple transmitter Tx shown in FIG. 3 includes a harmonic generator 41, a band-pass filter 42, and an amplifier 43. The harmonic generator 41 is configured such that the harmonic generator 41 distorts the AC low-frequency signal ACfL when the AC low-frequency signal ACfL is inputted thereto, thereby generating a harmonic signal that serves as a source signal of the AC high-frequency signal ACfH. The band-pass filter 42 is configured to detect only a harmonic signal component from a signal inputted from the harmonic generator 41 and output the detected harmonic signal component. The amplifier 43 is configured to amplify the harmonic signal component outputted from the band-pass filter 42 and output the amplified harmonic signal component to the primary-side winding of a transformer MT.

One end of the secondary-side winding of the transformer MT is connected to the running rail 21, and the other end of the secondary-side winding of the transformer MT is connected to one end of a line filter 44. The other end of the line filter 44 is connected to the third rail 20. One purpose of including the line filter 44 is to prevent the DC voltage of the third rail 20 from being applied to the transmitter Tx, and the other purpose of including the line filter 44 is as follows. If distortion of the AC high-frequency signal ACfH occurs in the simulated ripple transmitter Tx, then there is a possibility that frequencies based on the distortion affect train radio for railway signaling systems such as ATC (Automatic Train Control). Therefore, the line filter 44 is provided to perform wave shaping of the AC high-frequency signal ACfH in order to remove the distortion of the AC high-frequency signal ACfH in the simulated ripple transmitter Tx. The line filter 44 is formed by connecting a capacitor C and an inductor L in series. However, the line filter 44 is not limited to such a configuration. The line filter 44 may include at least a capacitor C for the purpose of blocking the DC voltage. A circuit including the transformer MT and the line filter 44 serves as a superimposing circuit. The superimposing circuit is connected to the third rail 20 (to be exact, between the third rail 20 and the running rail 21) in parallel with the rectifier SR1 and the rectifier SR2. By means of the superimposing circuit, on the third rail 20, a simulated ripple transmitted from the simulated ripple transmitter Tx is superimposed as the AC high-frequency signal ACfH on the DC voltage outputted from each of the rectifier SR1 and the rectifier SR2. The superimposing circuit is connected to the third rail 20 in parallel with the rectifier SR1 and the rectifier SR2. Therefore, for example, unlike the power cut-off detection method disclosed in Patent Literature 1, feeding power is prevented from flowing to the simulated ripple transmitter Tx. For this reason, for example, the current carrying capacity of the simulated ripple transmitter Tx can be reduced compared to a harmonic power supply in the power cut-off detection method of Patent Literature 1 in which the harmonic power supply is connected in series to a feeding power supply.

Next, the configuration of a rejection filter 46, which is an additional component of the above-described substation SS1, is described.

Respective output lines at the low-potential side of the rectifiers SR1 and SR2 are connected to the substation bus 45. The substation bus 45 is connected to the running rail 21 via the rejection filter 46. The rejection filter 46 shown in the diagram is configured as a parallel resonance circuit, which includes a DC reactor DCL and a capacitor C connected in parallel. The rejection filter 46 is provided for the following purpose. In a case where the internal impedance of the substation SS1 (particularly the impedance of the rectifiers SR1 and SR2) is low relative to the frequency of the AC high-frequency signal ACfH, the AC high-frequency signal ACfH transmitted toward the third rail 20 reaches the low-impedance rectifiers SR1 and SR2. This causes inefficient power consumption by the simulated ripple transmitter Tx. Therefore, in a case where the internal impedance of the substation SS1 is low relative to the AC high-frequency signal ACfH, a resonance frequency signal is blocked by parallel resonance by the rejection filter 46. As a result, the internal impedance of the substation SS1 relative to the AC high-frequency signal ACfH is increased, and thereby the transmission efficiency of the simulated ripple transmitter Tx is improved. It should be noted that the rejection filter 46 is merely an additional component of the substation SS1, and is not essential.

Next, the configuration of the electric vehicle 30, which is adapted for the third rail system and corresponds to the above-described substation SS1, is described.

Figure 4:
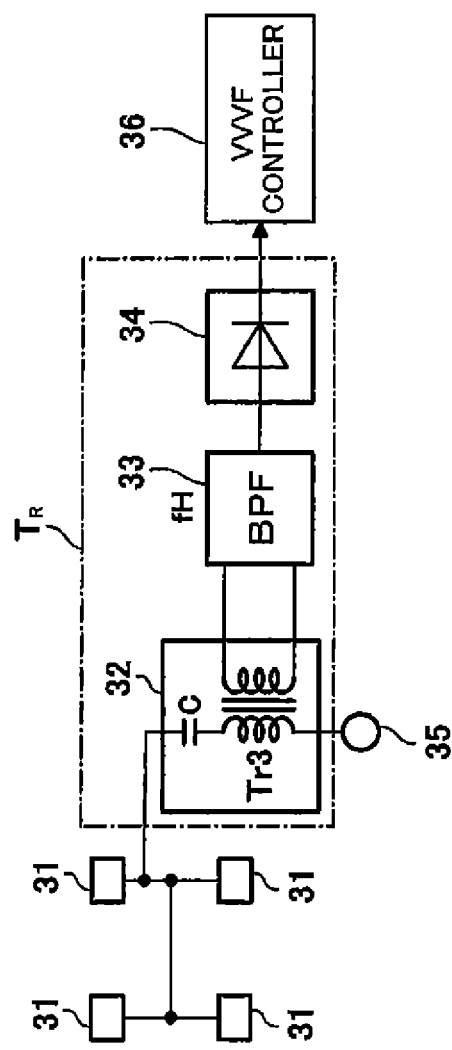
FIG. 4 is a circuit diagram showing an example of the configuration of an electric vehicle including a simulated ripple receiver according to Embodiment 1 of the present invention.

FIG. 4 shows an example of the configuration of the electric vehicle 30. The truck of the electric vehicle 30 is provided with contact shoes 31. While the electric vehicle 30 is running, the contact shoes 31 come into contact with the third rail 20, and thereby the electric vehicle 30 collects, from the third rail 20, voltages sent out from the substations SS1, SS2, and SS3 (i.e., feeding voltages) on each of which the AC high-frequency signal ACfH is superimposed. The electric vehicle 30 includes a simulated ripple receiver TR including a receiving transformer 32, a band-pass filter 33, and a rectifier 34. The receiving transformer 32 is formed by connecting a capacitor C and the primary-side winding of a transformer Tr3 in series. It should be noted that one end of the primary-side winding of the transformer Tr3 is connected to wheels 35, and voltages collected by the contact shoes 31 are applied to the wheels 35 via the receiving transformer 32. Both ends of the secondary-side winding of the transformer Tr3 are connected to the input side of the band-pass filter 33. The output side of the band-pass filter 33 is connected to the input side of the rectifier 34. By means of the band-pass filter 33, components of the AC high-frequency signal ACfH are extracted from the voltages collected by the contact shoes 31. The components of the AC high-frequency signal ACfH extracted by the band-pass filter 33 are rectified by the rectifier 34, and then supplied to a VVVF controller 36. According to this configuration, when the VVVF controller 36 has detected disappearance of the AC high-frequency signal ACfH (simulated ripple), which is to be received from the simulated ripple receiver TR, the VVVF controller 36 can control electric motors driving the wheels 35 to stop regenerative braking.

The above-described system, which is configured to stop regenerative braking when having detected, at the electric vehicle, disappearance of the simulated ripple superimposed on the feeding voltage sent from the substation, can be utilized to detect a gap/dead section of the third rail system, which is provided to connect between sections of different power systems. That is, when the electric vehicle passes through a gap/dead section of the third rail system (i.e., at the time of emergency), the system can detect disappearance of the simulated ripple transmitted from the substation and stop regenerative braking, thereby passing through the gap/dead section smoothly.

[Variation]

Although, in the above description, the substations SS1 to SS3 are configured to be adapted for a third rail system, the substations SS1 to SS3 may be configured to be adapted for an overhead contact line system using a catenary.

In each of the substations SS1 to SS3, two rectifier transformers Tr1 and Tr2 are operated in parallel. However, the number of rectifier transformers to be operated in parallel is not limited to two. A single rectifier transformer may be individually operated in each of the substations SS1 to SS3. In accordance with such changes, the configuration of the auxiliary relays on the power supply system of the transmitter Tx is suitably changed.

The potential transformers PT1 and PT2 and the voltage relays VTR1 and VTR2 are disposed at the secondary side of the rectifier transformers Tr1 and Tr2. However, as an alternative, the potential transformers PT1 and PT2 and the voltage relays VTR1 and VTR2 may be disposed at the primary side of the rectifier transformers Tr1 and Tr2. In either case, the potential transformers PT1 and PT2 and the voltage relays VTR1 and VTR2 are disposed at the input side of the rectifiers SR1 and SR2, and whether or not the rectifiers SR1 and SR2 are being energized is detected.

Although the potential transformers PT1 and PT2 detect voltages applied to the rectifiers SR1 and SR2, current detectors configured to detect currents flowing through the primary side of the rectifiers SR1 and SR2 may be provided.

Although the auxiliary relays 51 to 54 configured to close and open a path of power supplied to the simulated ripple transmitter Tx are provided, an auxiliary relay configured to open or close a path of an output signal from the simulated ripple transmitter Tx may be provided.

Each of the substations SS1 to SS3 includes one simulated ripple transmitter Tx configured to generate an AC high-frequency signal ACfH having an intended frequency. However, as an alternative, each of the substations SS1 to SS3 may include a plurality of simulated ripple transmitters Tx to generate a plurality of AC high-frequency signals ACfH having different frequencies from each other. In this case, the electric vehicle 30 is configured such that a plurality of simulated ripple receivers $T_R$ are provided corresponding to the plurality of simulated ripple transmitters Tx in each of the substations SS1 to SS3. Here, similar to the case where one simulated ripple transmitter Tx and one simulated ripple receiver $T_R$ are provided, the transmission-enabled/transmission-disabled conditions are applied to each simulated ripple transmitter Tx based on the closed state or opened state of the auxiliary relays 51 to 54.

In a case where a plurality of AC high-frequency signals ACfH having different frequencies from each other are used, if there are electric train routes that converge, then the AC high-frequency signals ACfH having different frequencies from each other are allocated to the respective routes.

[Summary]

According to the above-described regenerative braking emergency stop system, while power is being fed from the substations (SS1 to SS3) to the power-feed rail (20) (i.e., at a normal time), the rectifiers (SR1, SR2) receive power from outside (i.e., from a commercial power grid) and the switches (72-1, 72-2) are in a closed state. Accordingly, the simulated ripple transmitters (Tx) are in a state of being able to transmit simulated ripples to the power-feed rail (20). Even in a case where the rectifiers (SR1, SR2) become unable to perform normal rectifying operations due to increase in the regenerative voltage of the electric vehicle (30), the simulated ripples transmitted from the simulated ripple transmitters (Tx) are superimposed on the voltages sent from the substations (SS1 to SS3) to the power-feed rail (20). Therefore, the electric vehicle (30) can detect the simulated ripples by means of the simulated ripple receiver ($T_R$) from the power collected from the power-feed rail (20), thereby detecting that the power to the power-feed rail (20) has not been cut off, and the detection is not affected by the regenerative voltage. That is, erroneous stopping of the regenerative braking is eliminated. In addition, since it is not necessary to take rectifier ripples into consideration, the regenerative voltage generated by the regenerative braking of the electric vehicle can be designed to be an effective voltage higher than the no-load voltage of the substations. This allows the electric vehicle to generate regenerative power more efficiently without waste.

Meanwhile, in case of emergency, the switches (72-1, 72-2) are turned from in a closed state to in an opened state since it is necessary to stop feeding power from the substations (SS1 to SS3) to the power-feed rail (20). At the time, conditions, which are that the rectifiers (SR1, SR2) are receiving power from outside and that the switches (72-1, 72-2) are in a closed state, are not satisfied; therefore, the simulated ripple transmitters (Tx) are in a state of being unable to transmit simulated ripples to the power-feed rail (20). As a result, no simulated ripple flows to the power-feed rail (20), and the electric vehicle (30) detects that the simulated ripples to be detected by the simulated ripple receiver ($T_R$) have disappeared, which allows the electric vehicle (30) to stop regenerative braking.

The above regenerative braking emergency stop system includes detectors (PT1, PT2) configured to detect primary-side voltages or currents of the rectifier transformers (Tr1, Tr2) or secondary-side voltages of the rectifier transformers (Tr1, Tr2). This configuration makes it possible to suitably and readily detect a condition that the rectifiers (SR1, SR2) are receiving power from outside, which is one of the following AND conditions (conditions to allow a simulated ripple to be transmitted): a condition that the rectifiers (SR1, SR2) are receiving power from outside and a condition that the switches (72-1, 72-2) are in a closed state.

Further, in the above regenerative braking emergency stop system, on the power supply line (47) or output signal line of the simulated ripple transmitter (Tx), the auxiliary relays (51, 52) and the auxiliary relays (53, 54) are provided. The contact points of the auxiliary relays (51, 52) are closed or opened in conjunction with the opened/closed state of the switches (72-1, 72-2). The contact points of the auxiliary relays (53, 54) are closed or opened in conjunction with detection results of the voltage relays (VTR1, VTR2). This configuration makes it possible to suitably and readily realize the AND conditions (conditions to allow a simulated ripple to be transmitted), i.e., a condition that the rectifiers (SR1, SR2) are receiving power from outside and a condition that the switches (72-1, 72-2) are in a closed state.

Still further, in the above regenerative braking emergency stop system, the simulated ripple transmitter (Tx) disposed in each of the plurality of substations (SS1 to SS3) is configured such that the simulated ripple transmitter (Tx) generates a simulated ripple having the predetermined frequency based on the AC low-frequency signal (ACfL) and outputs the simulated ripple. The AC low-frequency signal (ACfL) has a frequency lower than a predetermined frequency and is inputted to the simulated ripple transmitter (Tx) via the common signal line 40. According to this configuration, simulated ripples transmitted from the respective simulated ripple transmitters (Tx) of the plurality of substations (SS1 to SS3) to the power-feed rail (20) synchronize with each other. That is, the AC low-frequency signal (ACfL) is used like a so-called pilot signal in the field of radio communication. The frequency of the AC low-frequency signal (ACfL) is so low as to allow synchronization among the plurality of substations (SS1 to SS3) to be readily made. Accordingly, relative phase differences among the simulated ripples transmitted from the plurality of respective substations (SS1 to SS3) are suppressed.

Still further, in the above regenerative braking emergency stop system, each of the plurality of substations (SS1 to SS3) includes a plurality of simulated ripple transmitters (Tx) configured to transmit respective simulated ripples having different frequencies from each other, and the electric vehicle (30) includes a plurality of simulated ripple receivers ($T_R$) corresponding to the plurality of respective simulated ripples. According to this configuration, a plurality of simulated ripples having different frequencies from each other can be used for respective DC electrified sections corresponding to the plurality of respective substations (SS1 to SS3). This makes it possible to flexibly construct the system to accommodate actual train routes.

In a case where train routes each formed by the running rail (21) and the power-feed rail (20) converge, for example, like grade-separated subway routes, the above-described regenerative braking emergency stop system is configured to allocate simulated ripples having different frequencies from each other to the respective routes. Thus, the simulated ripples can be prevented from interfering with each other.

Still further, the above regenerative braking emergency stop system allows the electric vehicle (30) to utilize simulated ripples to detect a gap/dead section of the third rail system. Specifically, when the electric vehicle (30) passes through a gap/dead section (i.e., at the time of emergency), the electric vehicle (30) can detect disappearance of simulated ripples transmitted from the substations (SS1 to SS3) and stop regenerative braking, thereby passing through the gap/dead section smoothly.

Still further, in the above regenerative braking emergency stop system, each of the substations (SS1 to SS3) includes the electrical storage device (80) configured to store power generated by the regenerative braking of the electric vehicle. According to this configuration, power generated during the regenerative braking can be stored in the electrical storage device (80) without waste, and the energy-saving effect of the entire power-feeding system is improved.

(Embodiment 2)
[Example of System Configuration]

Figure 5:
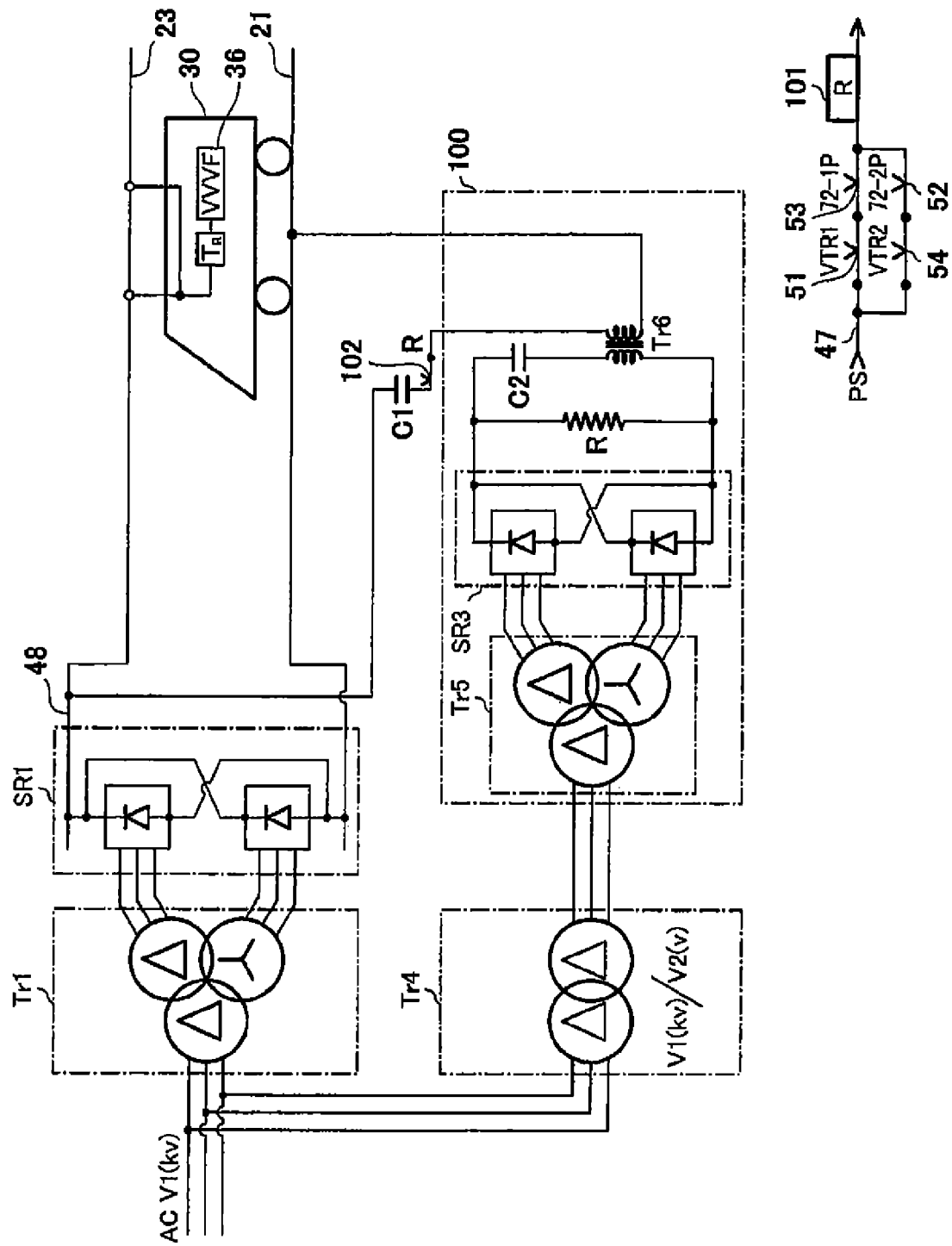
FIG. 5 is a circuit diagram showing an example of the configuration of a regenerative braking emergency stop system according to Embodiment 2 of the present invention.

FIG. 5 is a schematic diagram showing an example of the configuration of a regenerative braking emergency stop system according to Embodiment 2 of the present invention. The regenerative braking emergency stop system shown in FIG. 5 is configured to generate simulated ripples based on AC power received at the primary side of the rectifier transformers Tr1 and Tr2. The simulated ripples simulate ripples generated by the rectifiers SR1 and SR2 of the substation. As a result, the simulated ripples have the same frequencies and the same phases as the ripples generated by the rectifiers SR1 and SR2 of the substation.

The regenerative braking emergency stop system shown in FIG. 5 is configured such that, in the configuration example of the substation SS1 according to Embodiment 1 shown in FIG. 1, the simulated ripple transmitter Tx and the superimposing circuit including the transformer MT and the line filter 44 are replaced by an in-station transformer Tr4, a simulated ripple transmitter 100, and a superimposing circuit including the secondary-side winding of a transformer Tr6 and a DC-blocking capacitor C1. Further, the simulated ripple transmitter 100 shown in FIG. 5 realizes simulated-ripple transmission-enabled/transmission-disabled states not by opening or closing its power supply system but by opening or closing its output signal system. Therefore, the regenerative braking emergency stop system shown in FIG. 5 includes a transmission condition detection relay 101 and an auxiliary relay 102 for the transmission condition detection relay 101. It should be noted that, in FIG. 5, the rectifier transformer Tr2, the rectifier SR2, the switches 72-1 and 72-2, the rejection filter 46, the potential transformers PT1 and PT2, the voltage relays VTR1 and VTR2, and the electrical storage device 80 are not shown for the purpose of simplifying the drawing. Further, the example of FIG. 5 shows a case of not a third rail system but an overhead contact line system. Therefore, a contact line 23 and the running rail 21 are to be fed with power from the substation.

Similar to Embodiment 1, the primary side of the rectifier transformer Tr1 receives AC power (AC voltage V1) from outside (e.g., from a commercial power grid). The secondary side of the rectifier transformer Tr1 is connected to the input side of the rectifier SR1. That is, an AC voltage stepped down from the AC voltage V1 by the rectifier transformer Tr1 is applied to the input side of the rectifier SR1. It should be noted that, in the example of FIG. 5, a three-phase transformer with delta-delta connection and delta-star connection is used as the rectifier transformer Tr1. The contact line 23 and the running rail 21 are each connected to the output side of the rectifier SR1 via a switch (not shown). That is, the rectifier SR1 performs AC-DC conversion; and after the AC-DC conversion, the converted DC power (DC voltage) is fed to the contact line 23 and the running rail 21.

Meanwhile, the primary side of the rectifier transformer Tr1 is connected to the primary side of the in-station transformer Tr4. The secondary side of the in-station transformer Tr4 is connected to an input terminal of the simulated ripple transmitter 100. That is, an AC voltage V2 stepped down from the AC voltage V1 by the in-station transformer Tr4 is applied to the input terminal of the simulated ripple transmitter 100. It should be noted that, in the example of FIG. 5, a three-phase transformer with delta-delta connection is used as the in-station transformer Tr4. Examples of the primary-side voltage V1 and the secondary-side voltage V2 of the in-station transformer Tr4 are AC 22 kV and AC 200 V, respectively.

The simulated ripple transmitter 100 includes a rectifier transformer Tr5 and a rectifier SR3 having the same configurations as the rectifier transformer Tr1 and the rectifier SR1 for feeding power to the contact line 23. The AC voltage V2 stepped down from the AC voltage V1 by the in-station transformer Tr4 is applied to the primary side of the rectifier transformer Tr5, and the secondary side of the rectifier transformer Tr5 is connected to the input side of the rectifier SR1 That is, an output voltage from the rectifier SR3 is a DC voltage that is obtained by performing AC-DC conversion on the secondary-side voltage of the rectifier transformer Tr5. A ripple is superimposed on the DC voltage through a rectifying operation by the rectifier SR3. (Hereinafter, this ripple is referred to as a simulated ripple.) The output side of the rectifier SR3 is connected to a load resistor R, a capacitor C2, and the primary-side winding of the transformer Tr6. That is, the simulated ripple, which is extracted from the output voltage of the rectifier SR3, appears on the secondary-side winding of the transformer Tr6. It should be noted that, if the scale of the transformer Tr6 does not need to be taken into consideration, it is not essential to include the capacitor C2 which serves to protect the transformer Tr6.

One end of the secondary-side winding of the transformer Tr6 is connected to a substation bus 48 and the contact line 23 via the auxiliary relay 102 and the DC-blocking capacitor C1 (superimposing circuit), and the other end of the secondary-side winding of the transformer Tr6 is connected to the running rail 21. It should be noted that closing and opening of the contact point of the auxiliary relay 102 are in conjunction with closing and opening of the contact point of the transmission condition detection relay 101. The contact point of the transmission condition detection relay 101 is closed or opened under the same conditions as the transmission conditions of the simulated ripple transmitter Tx according to Embodiment 1 (see FIG. 2). That is, if the auxiliary relay 51 and the auxiliary relay 53 are both closed, or if the auxiliary relay 52 and the auxiliary relay 54 are both closed, then the contact points of the transmission condition detection relay 101 and the auxiliary relay 102 are closed. Thus, the simulated ripple transmitter 100 becomes in a state of being able to transmit a simulated ripple to the contact line 23, or in a transmission-enabled state. On the other hand, if the contact point of the auxiliary relay 51 or the auxiliary relay 53 is opened and the contact point of the auxiliary relay 52 or the auxiliary relay 54 is opened, then the contact points of the transmission condition detection relay 101 and the auxiliary relay 102 are opened. Thus, the simulated ripple transmitter 100 becomes in a state of being unable to transmit a simulated ripple to the contact line 23, or in a transmission-disabled state.

[Variation]

Although the above description has given an example in which the number of pulses of the rectifier SR1 of the substation is 12, the number of pulses may alternatively be 6. The number of pulses of the rectifier SR1 of the substation may be different from the number of pulses of the rectifier SR3 of the simulated ripple transmitter 100.

Although the above-described configuration is adapted for an overhead contact line system, the configuration may be adapted for a third rail system.

Although the two rectifier transformers Tr1 and Tr2 are operated in parallel in the substation, the number of rectifier transformers to be operated in parallel in the substation may be three or more. In accordance with such changes, the configuration of the auxiliary relays on the power supply system of the transmitter Tx is suitably changed.

The potential transformers PT1 and PT2 and the voltage relays VTR1 and VTR2 are disposed at the secondary side of the rectifier transformers Tr1 and Tr2. However, as an alternative, the potential transformers PT1 and PT2 and the voltage relays VTR1 and VTR2 may be disposed at the primary side of the rectifier transformers Tr1 and Tr2. In either case, the potential transformers PT1 and PT2 and the voltage relays VTR1 and VTR2 are disposed at the input side of the rectifiers SR1 and SR2, and whether or not the rectifiers SR1 and SR2 are being energized is detected.

Although the potential transformers PT1 and PT2 detect voltages applied to the rectifiers SR1 and SR2, current detectors configured to detect currents flowing through the primary side of the rectifiers SR1 and SR2 may be provided.

The above-described configuration makes it possible to provide a regenerative braking emergency stop system capable of: generating sufficient regenerative power from the electric vehicle at a normal time; and assuredly stopping regenerative braking of the electric vehicle running on the running rail in case of emergency where power feeding from the substation to the power-feed rail is stopped. In addition, the above configuration allows simulated ripples to have the same frequencies and the same phases as ripples generated by the rectifiers of the substation.

(Embodiment 3)

Figure 6:
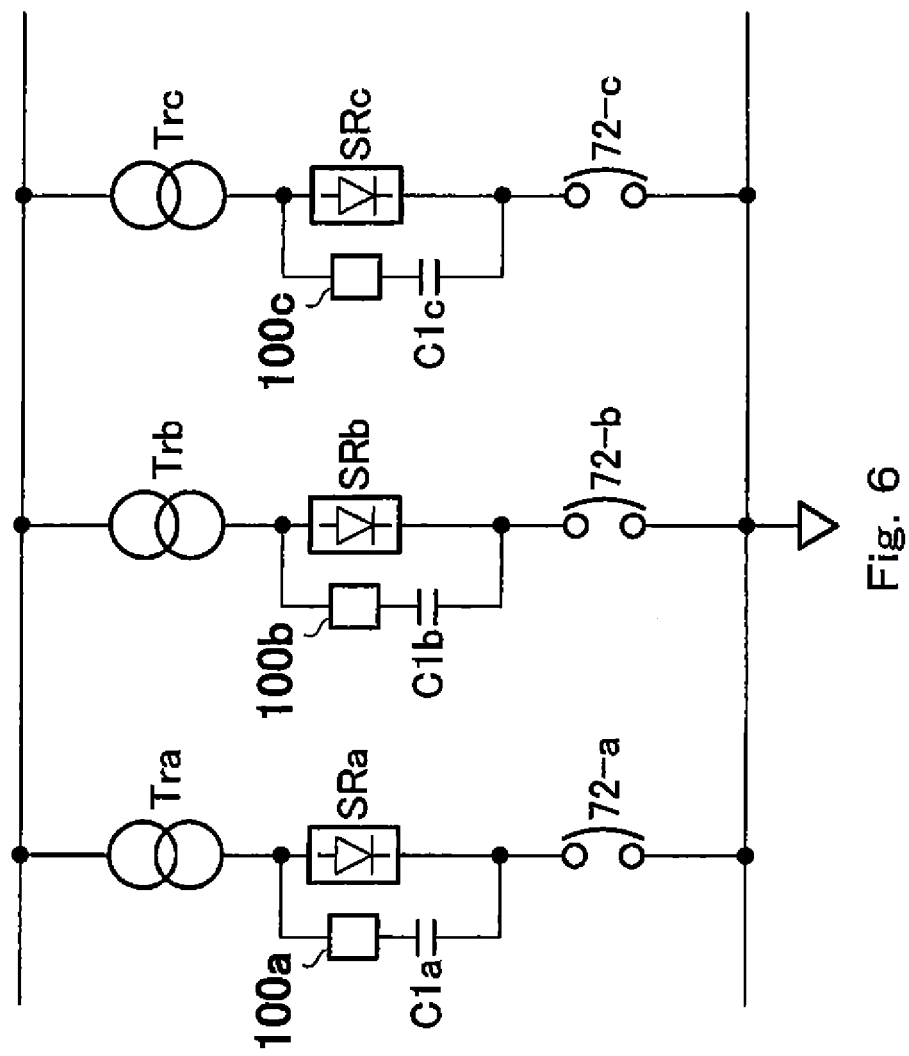
FIG. 6 is a circuit diagram showing an example of the configuration of a regenerative braking emergency stop system according to Embodiment 3 of the present invention.

FIG. 6 is a schematic diagram showing an example of the configuration of a regenerative braking emergency stop system according to Embodiment 3 of the present invention. It should be noted that, in FIG. 6, components outside a substation, such as a contact line which is either a third rail or an overhead line, a running rail, and an electric vehicle are not shown in order to simplify the drawing.

In the substation shown in FIG. 6, three rectifier transformers Tra, Trb, and Trc are operated in parallel. The substation is configured to feed power from the rectifier transformers Tra, Trb, and Trc to a power-feed rail (a third rail or an overhead line) via rectifiers SRa, SRb, and SRc and switches 72-a, 72-b, and 72-c. Moreover, the simulated ripple transmitter 100 and the DC-blocking capacitor C1 (superimposing circuit) shown in FIG. 5 are connected parallel to each of the rectifiers SRa, SRb, and SRc.

According to the above configuration, while power is being fed from the substation to the contact line (i.e., at a normal time), the rectifiers SRa, SRb, and SRc receive power from outside via the same power receiving line in the substation, and at least one of the switches 72-a, 72-b, and 72-c is in a closed state. Accordingly, at least one of the simulated ripple transmitters 100a, 100b, and 100e is in a state of being able to transmit a simulated ripple to the contact line. Here, even if the rectifiers SRa, SRb, and SRc become unable to perform normal rectifying operations due to increase in the regenerative voltage of the electric vehicle, simulated ripples transmitted from the simulated ripple transmitters 100a, 100b, and 100c are superimposed on the voltages sent from the substation to the contact line since the simulated ripple transmitters 100a, 100b, and 100c are not affected by the increase in the regenerative voltage owing to the DC-blocking capacitors C1a, C1b, and C1c. Therefore, the electric vehicle can detect the simulated ripples by means of simulated ripple receivers from the power collected from the contact line, thereby detecting that the power to the contact line has not been cut off, and the detection is not affected by the regenerative voltage. As a result, erroneous stopping of the regenerative braking is eliminated. Moreover, the above configuration allows the simulated ripples to have the same frequencies and the same phases as ripples generated by the rectifiers SRa, SRb, and SRc of the substation. Therefore, the simulated ripples can be readily produced.

Meanwhile, in case of emergency, all of the switches 72-a, 72-b, and 72-c are turned from in a closed state to in an opened state since it is necessary to stop feeding power from the substation to the contact line. At the time, the simulated ripple transmitters 100a, 100b, and 100c become in a state of being unable to transmit simulated ripples to the contact line. As a result, no simulated ripple flows to the contact line, and the electric vehicle detects that the simulated ripples to be detected by the simulated ripple receivers have disappeared, which allows the electric vehicle to stop regenerative braking.

In addition to the system configuration example shown in FIG. 6, variations similar to those of Embodiment 2 are applicable.

The above-described configuration makes it possible to provide a regenerative braking emergency stop system capable of: generating sufficient regenerative power from the electric vehicle at a normal time; and assuredly stopping regenerative braking of the electric vehicle running on the running rail in case of emergency where power feeding from the substation to the contact line is stopped. Moreover, the above configuration allows the simulated ripples transmitted from the simulated ripple transmitters to have the same frequencies and the same phases as ripples generated by the rectifiers of the substation. Therefore, the simulated ripples can be readily produced. Furthermore, units such as auxiliary relays and potential transformers for determining whether or not simulated ripples can be transmitted can be eliminated, which makes it possible to simplify the system configuration.

(Embodiment 4)

Figure 7:
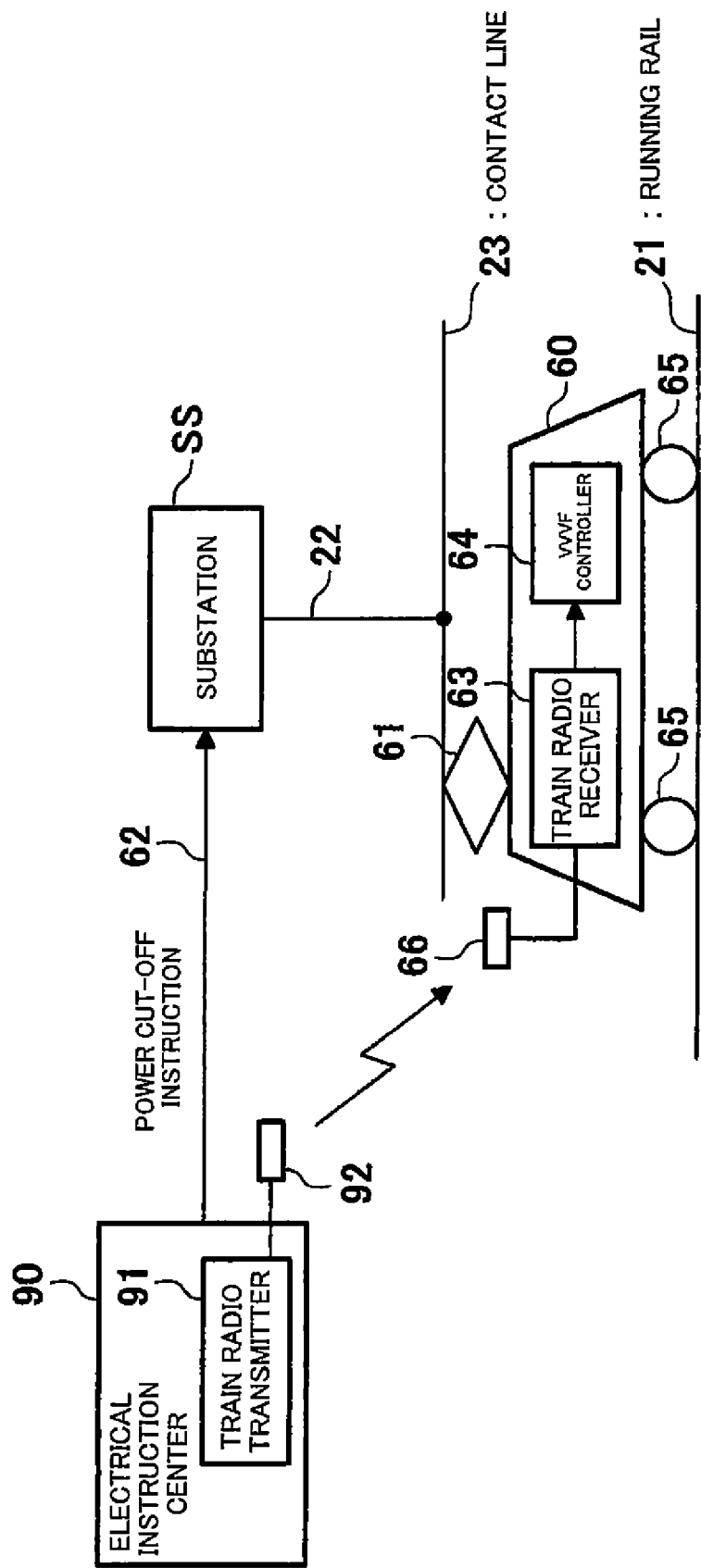
FIG. 7 is a schematic diagram showing an example of the configuration of a regenerative braking emergency stop system according to Embodiment 4 of the present invention.

FIG. 7 is a schematic diagram showing an example of the configuration of a regenerative braking emergency stop system according to Embodiment 4 of the present invention. The system shown in FIG. 7 is configured such that, if it becomes necessary in case of emergency to cut off power to the contact line 23, a power cut-off instruction is transmitted from an electrical instruction center 90 to a substation SS, and that a regenerative braking stop instruction to stop regenerative braking is also transmitted from the electrical instruction center 90 to an electric vehicle 60 by train radio. It should be noted that the train radio is one type of rail radio used for communication between a train crew and a train control center.

Specifically, the electrical instruction center 90 and the substation SS are communicably connected to each other via a dedicated communication line 62. Accordingly, at the time of feeding power to the contact line 23, a power-feeding instruction is transmitted from the electrical instruction center 90 to the substation SS via the dedicated communication line 62. As a result, power is fed from the substation SS to the contact line 23 via a power transmission line 22, and the electric vehicle 60 running on the running rail 21 collects the power from the contact line 23 via a pantograph 61. Meanwhile, in case of emergency, a power cut-off instruction is transmitted from the electrical instruction center 90 to the substation SS via the dedicated communication line 62. Upon receiving the power cut-off instruction, the substation SS stops feeding power to the contact line 23 by causing a feeding breaker (not shown) connected to one end of the power transmission line 22 to trip.

The electrical instruction center 90 includes a transmission radio unit including a train radio transmitter 91 and a transmission antenna 92. Correspondingly, the electric vehicle 60 includes a receiving radio unit including a receiving antenna 66 and a train radio receiver 63. It should be noted that the train radio transmitter 91 and the transmission antenna 92, and the receiving antenna 66 and the train radio receiver 63 can be configured by using, for example, leak coaxial cables, inductive radio, or general packet radio. For example, an audio line such as a push line, or a data communication line such as a packet communication line, may be adopted as a radio communication line between the electrical instruction center 90 and the electric vehicle 60. According to the above configuration, a regenerative braking stop instruction to stop regenerative braking can be transmitted from the electrical instruction center 90 to the electric vehicle 60 by train radio communication technology. It should be noted that, in the electric vehicle 60, a VVVF controller 64 is configured to control electric motors that drives wheels 65 to stop regenerative braking when having received the regenerative braking stop instruction via the receiving antenna 66 and the train radio receiver 63.

The above-described configuration makes it possible to provide a regenerative braking emergency stop system capable of: generating sufficient regenerative power from the electric vehicle at a normal time; and assuredly stopping regenerative braking of the electric vehicle running on the running rail in case of emergency where power feeding from the substation to the power-feed rail is stopped.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The regenerative braking emergency stop system according to the present invention is utilized for the purpose of stopping regenerative braking of an electric vehicle in case of emergency.

REFERENCE SIGNS LIST

Tx simulated ripple transmitter
$T_R$ simulated ripple receiver
PT1, PT2 potential transformer
SR1 to SR3 rectifier
SS1 to SS3 substation
Tr1, Tr2, Tr5 rectifier transformer Tr3, Tr6 transformer
Tr4 in-station transformer
VTR1, VTR2 voltage relay
C1 DC-blocking capacitor
20 third rail
21 running rail
22 power transmission line
23 contact line
30 electric vehicle
31 contact shoe
32 receiving transformer
33 band-pass filter
34 rectifier
35 wheel
36 VVVF controller
40 common signal line
41 harmonic generator
42 band-pass filter
43 amplifier
44 line filter
45 substation bus (negative side)
46 rejection filter
47 power supply line
48 substation bus (positive side)
51 auxiliary relay
52 auxiliary relay
53 auxiliary relay
54 auxiliary relay
60 electric vehicle
61 pantograph
62 dedicated communication line
63 train radio receiver
64 VVVF controller
65 wheel
66 receiving antenna
72-1, 72-2 switch
80 electrical storage device
90 electrical instruction center
91 train radio transmitter
92 transmission antenna
100 simulated ripple transmitter
101 transmission condition detection relay
102 auxiliary relay

The invention claimed is:

1. A regenerative braking emergency stop system comprising: a substation; a power-feed rail fed with power from the substation; a running rail; and an electric vehicle configured to collect power from the power-feed rail and run on the running rail, the substation including: a rectifier transformer configured to transform AC power received from outside; a rectifier configured to convert the AC power transformed by the rectifier transformer into DC power; and a switch disposed on an electrical path between the rectifier and the power-feed rail and configured to be in a closed state or an opened state, the electric vehicle including a power collector configured to collect power from the power-feed rail, wherein
the substation further includes:
a simulated ripple transmitter configured to transmit a simulated ripple, the simulated ripple being an AC signal having a predetermined frequency;
a superimposing circuit connected to the power-feed rail in parallel with the rectifier and configured to superimpose the simulated ripple transmitted from the simulated ripple transmitter on DC power outputted from the rectifier; and
a relay device configured to allow the simulated ripple transmitter to transmit the simulated ripple when the rectifier is receiving power from outside and the switch is in a closed state, and
the electric vehicle further includes:
a simulated ripple receiver configured to detect the simulated ripple from DC power collected by the power collector; and
a controller configured to perform control to stop regenerative braking of the electric vehicle when having detected that the simulated ripple to be detected by the simulated ripple receiver has disappeared.

2. The regenerative braking emergency stop system according to claim 1, comprising a detector configured to detect a primary-side voltage, a primary-side current, or a secondary-side voltage of the rectifier transformer, wherein
the relay device is configured to detect that the rectifier is receiving power from outside based on a detection result of the detector.

3. The regenerative braking emergency stop system according to claim 2, wherein
the relay device includes:
a first relay whose contact point is opened and closed in conjunction with the opened state and the closed state of the switch; and
a second relay whose contact point is opened and closed in conjunction with a detection result of the detector, and
the first relay and the second relay are connected in series on a power supply line or an output signal line of the simulated ripple transmitter.

4. The regenerative braking emergency stop system according to claim 1, wherein
a plurality of the substations are provided for the power-feed rail, and
the simulated ripple transmitter provided for each of the plurality of the substations is configured such that
the simulated ripple transmitter generates a simulated ripple having the predetermined frequency based on an AC low-frequency signal and outputs the simulated ripple, the AC low-frequency signal having a frequency lower than the predetermined frequency and being inputted to the simulated ripple transmitter via a common signal line.

5. The regenerative braking emergency stop system according to claim 1, wherein
the simulated ripple transmitter includes:
a rectifier transformer configured to transform AC power received from a power receiving line, from which the substation receives AC power;
a rectifier configured to convert the AC power transformed by the rectifier transformer into DC power; and
a transformer configured to extract a simulated ripple superimposed on the DC power converted by the rectifier, and
the superimposing circuit includes a DC-blocking capacitor disposed between an output terminal of the simulated ripple transmitter and the power-feed rail.

6. The regenerative braking emergency stop system according to claim 1, comprising:
a plurality of the simulated ripple transmitters in the substation, the plurality of the simulated ripple transmitters being configured to transmit a plurality of the simulated ripples that have different frequencies from each other; and a plurality of the simulated ripple receivers in the electric vehicle, the plurality of the simulated ripple receivers corresponding to the plurality of the simulated ripples, respectively.

7. The regenerative braking emergency stop system according to claim 6, wherein, in a case where routes each formed by the running rail and the power-feed rail converge, the simulated ripples having different frequencies from each other are allocated to the respective routes.

8. The regenerative braking emergency stop system according to claim 1, wherein the power-feed rail is a third rail, and the electric vehicle detects a gap/dead section of a third rail system when having detected that the simulated ripple to be detected by the simulated ripple receiver has disappeared.

9. The regenerative braking emergency stop system according to claim 1, wherein the substation includes an electrical storage device configured to store power generated by the regenerative braking of the electric vehicle.

10. A regenerative braking emergency stop system comprising: a substation; a power-feed rail fed with power from the substation; a running rail; and an electric vehicle configured to collect power from the power-feed rail and run on the running rail, the substation including: a rectifier transformer configured to transform AC power received from outside; a rectifier configured to convert the AC power transformed by the rectifier transformer into DC power; and a switch disposed on an electrical path between the rectifier and the power-feed rail and configured to be in a closed state or an opened state, the electric vehicle including a power collector configured to collect power from the power-feed rail, wherein the substation includes:

a plurality of power-feeding systems each including the rectifier transformer, the rectifier, and the switch;

a simulated ripple transmitter configured to transmit a simulated ripple, the simulated ripple being an AC signal having a predetermined frequency; and a superimposing circuit configured to superimpose the simulated ripple transmitted from the simulated ripple transmitter on DC power outputted from the rectifier, the simulated ripple transmitter and the superimposing circuit are connected parallel to the rectifier, the simulated ripple transmitter includes:

a rectifier transformer configured to transform AC power received from a power receiving line, from which the substation receives AC power;

a rectifier configured to convert the AC power transformed by the rectifier transformer into DC power; and a transformer configured to extract a simulated ripple superimposed on the DC power converted by the rectifier, the superimposing circuit includes a DC-blocking capacitor disposed between an output terminal of the simulated ripple transmitter and the power-feed rail, and the electric vehicle further includes:

a simulated ripple receiver configured to detect the simulated ripple from DC power collected by the power collector; and a controller configured to perform control to stop regenerative braking of the electric vehicle when having detected that the simulated ripple to be detected by the simulated ripple receiver has disappeared.

\* \* \* \* \*